(12) United States Patent
Hong

(10) Patent No.: US 12,279,164 B2
(45) Date of Patent: Apr. 15, 2025

(54) METHOD AND APPARATUS FOR UPDATING RADIO NOTIFICATION AREA

(71) Applicant: Beijing Xiaomi Mobile Software Co., Ltd., Beijing (CN)

(72) Inventor: Wei Hong, Beijing (CN)

(73) Assignee: BEIJING XIAOMI MOBILE COMPANY SOFTWARE CO., LTD., Beijing (CN)

( * ) Notice: Subject to any disclaimer, the term of this patent is extended or adjusted under 35 U.S.C. 154(b) by 415 days.

(21) Appl. No.: 17/923,901

(22) PCT Filed: May 8, 2020

(86) PCT No.: PCT/CN2020/089199
§ 371 (c)(1),
(2) Date: Nov. 7, 2022

(87) PCT Pub. No.: WO2021/223217
PCT Pub. Date: Nov. 11, 2021

(65) Prior Publication Data
US 2023/0224771 A1    Jul. 13, 2023

(51) Int. Cl.
*H04W 36/00* (2009.01)
*H04W 24/02* (2009.01)
(Continued)

(52) U.S. Cl.
CPC ....... *H04W 36/0055* (2013.01); *H04W 24/02* (2013.01); *H04W 24/10* (2013.01); *H04W 68/08* (2013.01)

(58) Field of Classification Search
CPC ... H04W 60/005; H04W 88/06; H04W 76/15; H04W 36/0069; H04W 8/18;
(Continued)

(56) References Cited

U.S. PATENT DOCUMENTS

| 11,595,808 B2 * | 2/2023 | Li .......................... H04W 8/18 |
| 2013/0005394 A1 * | 1/2013 | Geary .................. H04W 52/028 455/552.1 |

(Continued)

FOREIGN PATENT DOCUMENTS

| CN | 110089141 A | 8/2019 |
| CN | 110431863 A | 11/2019 |

(Continued)

OTHER PUBLICATIONS

European Patent Office, Extended European Search Report Issued in Application No. 20934676.6, Jan. 3, 2024, Germany, 8 pages.

(Continued)

*Primary Examiner* — Olumide Ajibade Akonai
(74) *Attorney, Agent, or Firm* — Volpe Koenig

(57) ABSTRACT

A method and apparatus for updating a radio notification area. The method is applicable to a terminal configured with at least a first subscriber identity module (SIM) card and a second SIM card, and includes: receiving configuration information sent by a first base station; when the second SIM card is to be handed over to a second base station, sending radio notification area update information of the first SIM card to the second SIM card based on the configuration information in response to that the second base station is located outside a radio notification area configured by the first base station for the first SIM card; and sending, through the second SIM card and to the first base station, a measurement report of handing over to the second base station, wherein the measurement report includes the radio notification area update information of the first SIM card.

17 Claims, 11 Drawing Sheets

(51) Int. Cl.
*H04W 24/10* (2009.01)
*H04W 68/08* (2009.01)

(58) Field of Classification Search
CPC . H04W 36/22; H04W 36/00; H04W 36/0011; H04W 36/0022; H04W 36/0033; H04W 8/183; H04W 36/0055; H04W 36/36; H04W 76/20; H04W 8/20
See application file for complete search history.

(56) References Cited

U.S. PATENT DOCUMENTS

| | | |
|---|---|---|
| 2015/0065106 A1 | 3/2015 | Catovic et al. |
| 2016/0286600 A1 | 9/2016 | Faccin et al. |
| 2017/0048768 A1* | 2/2017 | Komati ............... H04W 36/06 |
| 2019/0150221 A1 | 5/2019 | Tseng et al. |
| 2020/0137556 A1* | 4/2020 | Park .................. H04L 1/0045 |
| 2021/0105738 A1* | 4/2021 | Bendlin ............... H04W 8/24 |
| 2022/0264405 A1 | 8/2022 | Hong et al. |

FOREIGN PATENT DOCUMENTS

| | | |
|---|---|---|
| CN | 110495208 A | 11/2019 |
| CN | 110636499 A | 12/2019 |
| EP | 3516890 A2 | 7/2019 |
| WO | 2020067826 A1 | 4/2020 |
| WO | WO-2020186092 A2 * | 9/2020 ........... H04L 5/0048 |

OTHER PUBLICATIONS

ISA State Intellectual Property Office of the People's Republic of China, Written Opinion of the International Searching Authority Issued in Application No. PCT/CN2020/089199, Jan. 29, 2021, WIPO, 8 pages.
Indian Office Action issued on Feb. 14, 2023 for Indian Patent Application No. 202247070422.
IISA State Intellectual Property Office of the People's Republic of China, International Search Report Issued in Application No. PCT/CN2020/089199, Jan. 29, 2021, WIPO, 5 pages.
State Intellectual Property Office of the People's Republic of China, Office Action and Search Report Issued in Application No. 2020800008948, May 13, 2022, 12 pages.(Submitted with Machine/Partial Translation).
Huawei etc."Update RNA Update Procedure Security" "3GPP TSG-SA WG3 Meeting #93 S3-183208" Oct. 12, 2018, 2 pages.
3GPP"NR; NR and NG-RAN Overall Description" "3GPP TS 38.300 V15.6.0" Jun. 28, 2019, 99 pages.
VIVO "Report of phase 1 Multi-SIM email discussion" "3GPP TSG-RAN Wg Meeting #85 RP-191898 Newport Beach, USA, Sep. 16-20, 2019" Sep. 20, 2019, 36 pages.

* cited by examiner

METHOD AND APPARATUS FOR UPDATING RADIO NOTIFICATION AREA

CROSS REFERENCE TO RELATED APPLICATIONS

This application is the national phase of International Application No. PCT/CN2020/089199 filed on May 8, 2020, the disclosure of which is hereby incorporated by reference in its entirety.

TECHNICAL FIELD

The present disclosure relates to the field of communication technologies, and in particular to a method for updating a radio notification area, an apparatus for updating a radio notification area, an electronic device and a computer readable storage medium.

BACKGROUND

In 5G New Radio (NR), a state of a terminal not only includes a connected state (RRC_CONNECTED) and an idle state (RRC_IDLE), but also introduces an inactive state (RRC_INACTIVE).

For a terminal in the inactive state, a base station can configure a notification area of a radio access network (RAN) for the terminal, which is referred to as a radio notification area (RNA). When the terminal accesses a new base station and the new base station is not in a radio notification area configured by a first base station for the terminal, it is necessary for the terminal to update the radio notification area.

In a terminal including multiple subscriber identity module (SIM) cards, different SIM cards will be regarded as different terminals by a network. When there are both SIM cards in the inactive state and SIM cards in the connected state in the network, a process of updating a radio notification area will be complicated.

SUMMARY

In view of this, embodiments of the present disclosure provide a method for updating a radio notification area, an apparatus for updating a radio notification area, an electronic device and a computer readable storage medium to solve technical problems in the related art.

According to a first aspect of the embodiments of the present disclosure, there is provided a method for updating a radio notification area, being applicable to a terminal configured with at least a first subscriber identity module (SIM) card and a second SIM card, the method including:

receiving configuration information sent by a first base station;

when the second SIM card is to be handed over to a second base station, sending radio notification area update information of the first SIM card to the second SIM card based on the configuration information in response to that the second base station is located outside a radio notification area configured by the first base station for the first SIM card; and sending, through the second SIM card and to the first base station, a measurement report of handing over to the second base station, wherein the measurement report comprises the radio notification area update information of the first SIM card.

According to a second aspect of the embodiments of the present disclosure, there is provided a method for updating a radio notification area, being applicable to a first base station, the method including:

sending configuration information to a terminal, wherein the terminal is configured with at least a first subscriber identity module (SIM) card and a second SIM card, and the configuration information is at least configured to indicate the terminal to send a measurement report of handing over to a second base station to the first base station through the second SIM card in response to that the first SIM card is in an inactive state and the second SIM card is in a connected state, wherein the measurement report comprises radio notification area update information of the first SIM card;

receiving the measurement report of handing over to the second base station sent by the second SIM card, wherein the measurement report of handing over to the second base station comprises the radio notification area update information of the first SIM card; and sending a request for the second SIM card to hand over the second base station to the second base station, wherein the request comprises context information of the first SIM card.

According to a third aspect of the embodiments of the present disclosure, there is provided a method for updating a radio notification area, being applicable to a second base station, the method including:

receiving a request for a second subscriber identity module (SIM) card in a terminal to hand over to the second base station sent by a first base station, wherein the request comprises context information of a first SIM card in the terminal, the terminal is configured with at least the first SIM card and the second SIM card, the first SIM card is in an inactive state, and the second SIM card is in a connected state.

According to a fourth aspect of the embodiments of the present disclosure, there is provided an electronic device, including:

a processor; and a memory for storing instructions executable by the processor, wherein the processor is configured to implement the method for updating the radio notification area described in any of the above embodiments.

According to the fifth aspect of the embodiment of the present disclosure, a computer readable storage medium storing a computer program, wherein the computer program, when executed by a processor, causing the processor to implement the steps of the method for updating the radio notification area described in any of the above embodiments.

BRIEF DESCRIPTION OF THE DRAWINGS

In order to explain the technical solutions more clearly in the embodiments of the present disclosure, the drawings required for the description of the embodiments will be briefly introduced below. It is obvious that the drawings in the following description are only some embodiments of the present disclosure. For those of ordinary skill in the art, other drawings can also be obtained based on these drawings, without paying any creative labor.

DETAILED DESCRIPTION OF THE EMBODIMENTS

The technical solutions in the embodiments of the present disclosure will be described clearly and completely in conjunction with the drawings in the embodiments of the present disclosure below. Obviously, the described embodiments are only a part of the embodiments of the present disclosure, but not all the embodiments. Based on the embodiments in the present disclosure, all other embodiments obtained by a person of ordinary skill in the art without creative efforts fall within the protection scope of the present disclosure.

Figure 1:
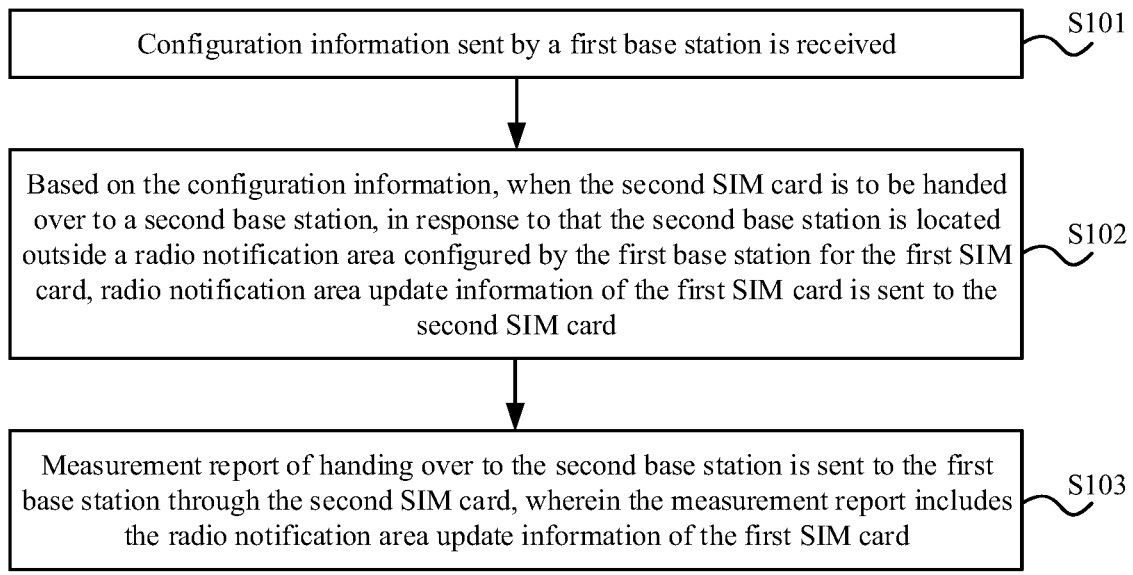
FIG. 1 is a schematic flowchart illustrating a method for updating a radio notification area according to an embodiment of the present disclosure.

FIG. 1 is a schematic flowchart illustrating a method for updating a radio notification area according to an embodiment of the present disclosure. The method for updating the radio notification area shown in this embodiment can be applied to a terminal. The terminal can be used as user equipment to communicate with a base station, wherein the base station can be a 5G base station, and the terminal includes, but is not limited to, an electronic device such as a mobile phone, a tablet computer, a wearable device, and the like.

The terminal is configured with at least a first subscriber identity module (SIM) card and a second SIM card. It should be noted that the first SIM card and the second SIM card are not two specific SIM cards, but any two different SIM cards in the terminal. The terminal can also include other SIM cards besides the first SIM card and the second SIM card.

As shown in FIG. 1, the method for updating the radio notification area can include the following steps S101 to S103.

In step S101, configuration information sent by a first base station is received.

The configuration information is configured to indicate the terminal to integrate a process of updating the radio notification area with a process of handing over the base station by the second SIM card in response to the first SIM card being in an inactive state (in the inactive state for the first base station) and the second SIM card is in a connected state (in the connected state for the first base station).

Based on the configuration information, the following steps S102 and S103 can be performed. In step S102, when the second SIM card is to be handed over to a second base station, in response to the second base station being located outside a first radio notification area configured by the first base station for the first SIM card, the radio notification area update information of the first SIM card is sent to the second SIM card.

In step S103, a measurement report of handing over to the second base station is sent to the first base station through the second SIM card, wherein the measurement report includes the radio notification area update information of the first SIM card.

In one embodiment, the first SIM card and the second SIM card in the terminal can be in different states; for example, the first SIM card is in the inactive state for the first base station, and the second SIM card is in the connected state for the first base station. For the first SIM card in the inactive state, the first base station can configure a radio notification area for the terminal.

In the related art, when it is detected that it is necessary for the terminal to access a new base station (for example, it is necessary for the second SIM card in the terminal to be handed over from the first base station to the second base station) if the second base station is located outside the first radio notification area configured by the first base station for the first SIM card, it is necessary to update the radio notification area.

First, the first SIM card sends the radio notification area update information to the second base station. In this process, the first SIM card is temporarily set to the connected state. Then, the second base station can determine that the first SIM card is to update the radio notification area based on the received radio notification area update information, and send a context request to the first base station to request the context information of the first SIM card; further, the first base station sends the context information of the first SIM card to the second base station, and the second base station restores the first SIM card to a disconnected state by sending radio resource control release signaling (RRCRelease) to the first SIM card.

However, the above process of updating the radio notification area occurs when the second SIM card is to be handed over to the second base station, and thus, the terminal not only performs the above process of updating the radio notification area, but also performs the process of handing over the second SIM card to the second base station. The two processes are performed respectively, which will communicate with the base station many times, thereby taking up a lot of communication resources, and consuming more time.

In this embodiment, the first base station can send the configuration information to the terminal, based on the configuration information, in response to that the first SIM card is in the inactive state and the second SIM card is in the connected state, the terminal can integrate the process of updating the radio notification area with the process of handing over the base station by the second SIM card. Specifically, the above steps S102 and S103 can be performed based on the configuration information.

In one embodiment, the second SIM card can detect information such as signal strength between different base stations, and can determine whether it is necessary to hand over the second base station according to a detection result. When the second SIM card determines that it is necessary to be handed over from the first base station to the second base station, the terminal can determine whether the second base station is located outside the first radio notification area configured by the first base station for the first SIM card. If the second base station is located outside the first radio notification area configured by the first base station for the first SIM card, it is determined that it is necessary to update the radio notification area, the terminal can send the radio notification area update information of the first SIM card to the second SIM card. The radio notification area update information of the first SIM card can include contents of radio resource control resume request signaling (RRCResumeRequest), for example, an identification of the first SIM card and a reason for updating the radio notification area.

When it is detected that it is necessary to be handed over to the second base station, the second SIM card can generate a measurement report of handing over to the second base station based on the above detection result, and send the measurement report to the first base station. The first base station can determine that it is necessary for the second SIM card to be handed over to the second base station, and send a request for handing over the second base station to the second base station, so that the second base station can know that it is necessary for the second SIM card to be accessed, therefore, the second SIM card can be successfully handed over to the second base station.

In addition, the measurement report sent by the second SIM card to the first base station can also include the radio notification area update information of the first SIM card. Therefore, it is not necessary for the first SIM card to send the radio notification area update information to the second base station or temporarily adjust the state of the first SIM card, thereby reducing the number of times that the terminal communicates with the base station, simplifying the communication flow, and saving communication resources.

According to the embodiments of the present disclosure, the measurement report sent by the second SIM card to the first base station can further include the radio notification area update information of the first SIM card. Further, the first base station can also send the request for the second SIM card to hand over the second base station to the second base station, wherein the request includes the context information of the first SIM card.

Accordingly, it is not necessary for the first SIM card to send the radio notification area update information to the second base station or temporarily adjust the state of the first SIM card, thereby reducing the number of times the terminal communicates with the base station. Further, the context information of the first SIM card can be carried by the request of handing over the second base station to send to the second base station without the second base station requesting the context information of the first SIM card from the first base station, thereby reducing the number of times that the first base station communicates with the second base station, simplifying the communication flow, and saving communication resources.

Figure 2:
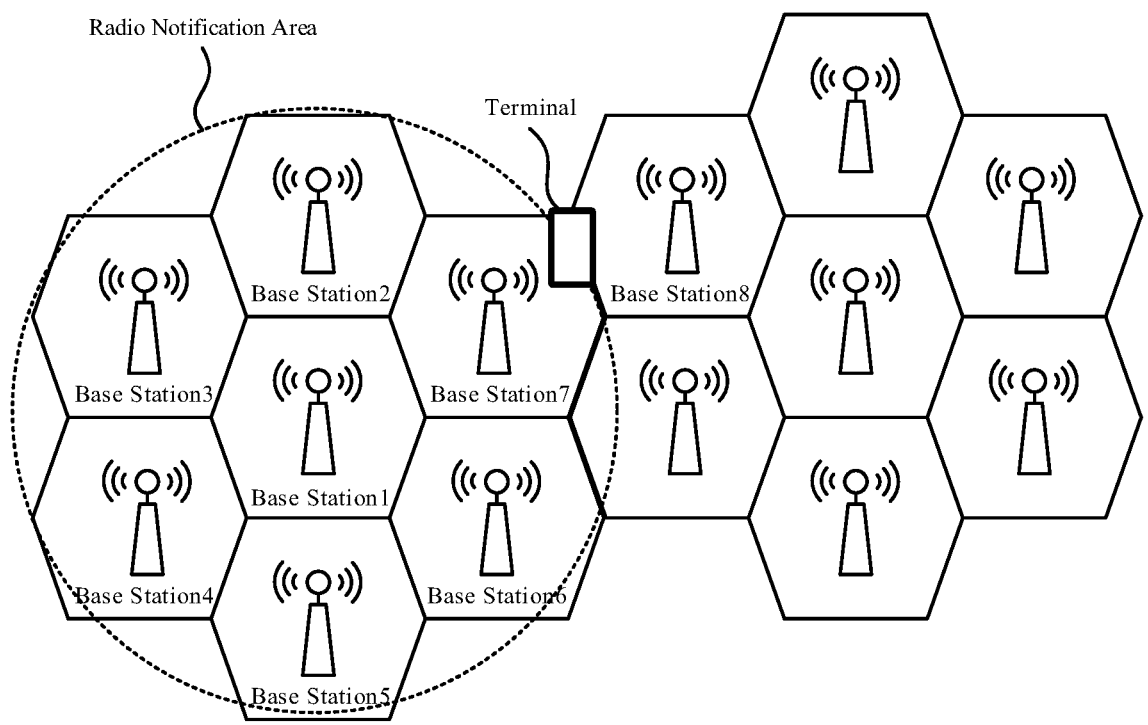
FIG. 2 is a schematic diagram illustrating an application scenario of a method for updating a radio notification area according to an embodiment of the present disclosure.

FIG. 2 is a schematic diagram illustrating an application scenario of a method for updating a radio notification area according to an embodiment of the present disclosure. As shown in FIG. 2, a base station 1 configures a radio notification area for a first SIM card that is in an inactive state in a terminal in advance. When moving near a base station 8, the terminal determines that it is necessary to be handed over to base station 8, and base station 8 is located outside the radio notification area.

In this case, the radio notification area update information of the first SIM card can be sent to the second SIM card. When sending the measurement report of handing over to the base station 8 to base station 1, the second SIM card can carry the radio notification area update information of the first SIM card in the measurement report.

When receiving the measurement report sent by the second SIM card, the base station 1 can simultaneously receive the radio notification area update information of the first SIM card in the measurement report, and determine that it is necessary for the second SIM card to be handed over to the base station 8 based on the measurement report, and it is necessary to update the radio notification area of the first SIM card based on the radio notification area update information of the first SIM card. Therefore, the base station 1 can send a request for the second SIM card to hand over the base station 8 to the base station 8, and context information of the first SIM card can be carried in the request.

After receiving the request sent by the base station 1, the base station 8 can determine that it is necessary for the second SIM card to be handed over to the base station 8, and perform corresponding actions, so that the second SIM card can be successfully handed over to base station 8, for example, the second SIM card can be paged. In addition, since the context information of the first SIM card is received, the first SIM card in the inactive state can be quickly adjusted to the connected state for communication based on the context information of the first SIM card.

Figure 3:
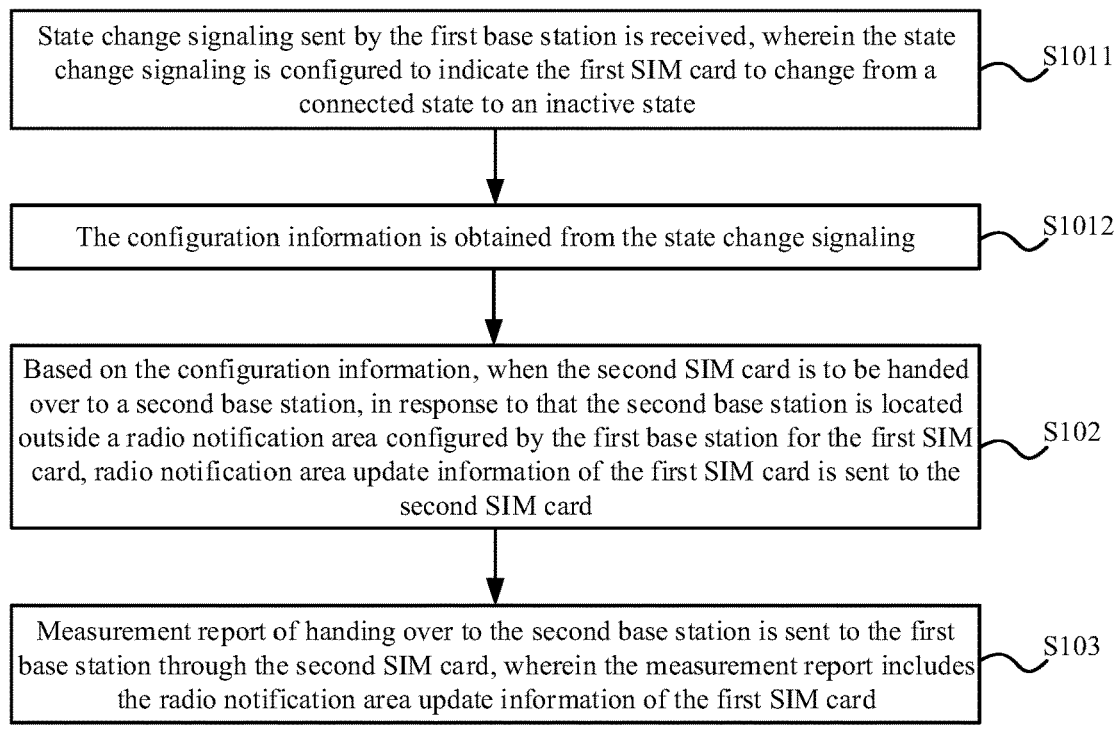
FIG. 3 is a schematic flowchart illustrating a method for updating a radio notification area according to an embodiment of the present disclosure.

FIG. 3 is a schematic flowchart illustrating a method for updating a radio notification area according to an embodiment of the present disclosure. As shown in FIG. 3, receiving configuration information sent by the first base station includes steps S1011 and S1012.

In step S1011, state change signaling sent by the first base station is received, wherein the state change signaling is configured to indicate the first SIM card to change from a connected state to an inactive state.

In step S1012, the configuration information is obtained from the state change signaling.

In one embodiment, the base station can send the state change signaling to the terminal to change the first SIM card in the terminal from the connected state to the inactive state, and the above configuration information can be carried in the state change signaling. Therefore, it is not necessary for the base station to send the above configuration information to the terminal through a single signaling, thereby simplifying the communication flow.

Figure 4:
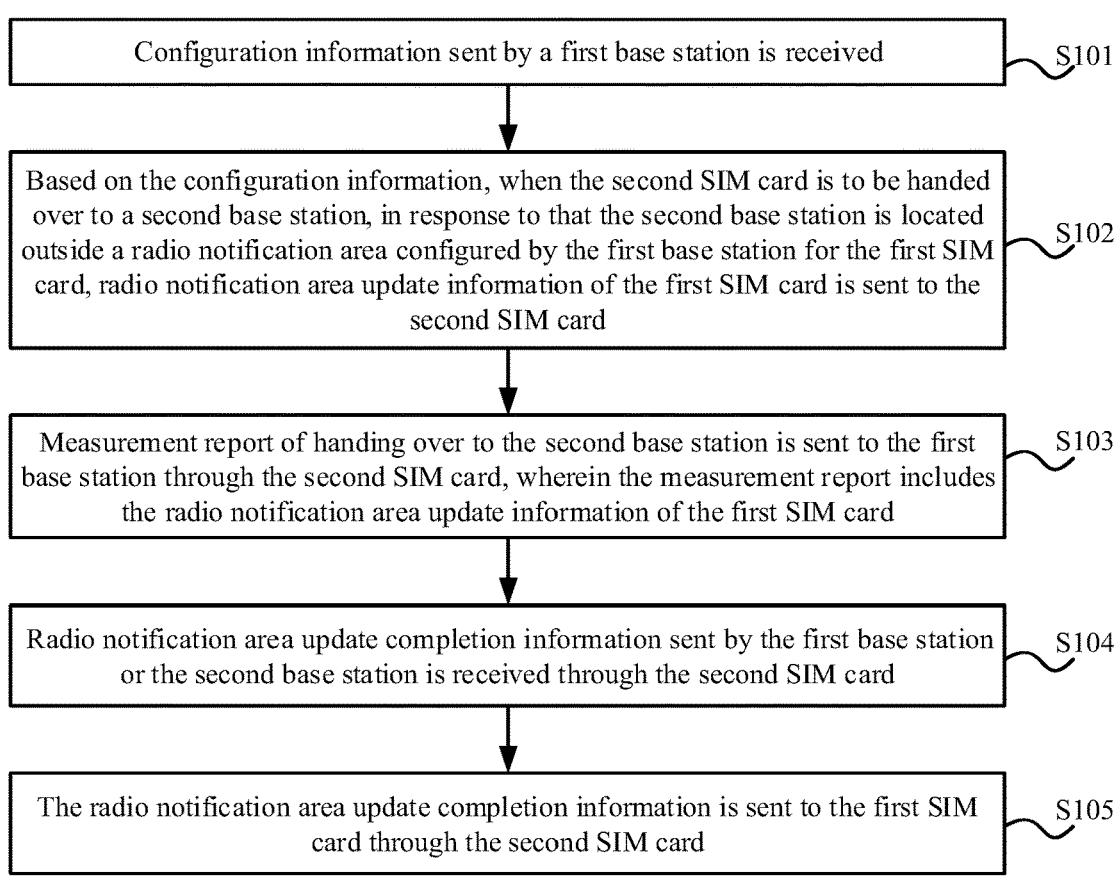
FIG. 4 is a schematic flowchart illustrating a method for updating a radio notification area according to an embodiment of the present disclosure.

FIG. 4 is a schematic flowchart illustrating a method for updating a radio notification area according to an embodiment of the present disclosure. As shown in FIG. 4, the method further includes steps S104 and S105.

In step S104, the radio notification area update completion information sent by the first base station or the second base station is received through the second SIM card.

In step S105, the radio notification area update completion information is sent to the first SIM card through the second SIM card.

In one embodiment, the first base station can send a request for the second SIM card to hand over the second base station to the second base station to the second base station, and the context information of the first SIM card can be carried in the request, so that the second base station can, according to the context information of the first SIM card, quickly adjust the first SIM card from the inactive state to the connected state for communication. After receiving the context information of the first SIM card, the second base station can determine that the first SIM card has updated the radio notification area, and send radio notification area update completion information to the first SIM card. After receiving the radio notification area update completion information, the first SIM card can determine that a communication connection can be established with the second SIM card.

In one embodiment, when or after the communication connection is established with the second SIM card, the second base station can first send the radio notification area update completion information to the second SIM card, and then the second SIM card can send the radio notification area update completion information to the first SIM card. The radio notification area update completion information can include a period of sending paging signaling by the second base station, a radio network temporary identity (RNTI) configured for the first SIM card, and the like, so that the first SIM card can communicate with the second base station based on the radio notification area update completion information.

In one embodiment, the second base station can first send the radio notification area update completion information to the first base station. Then the first base station can send the radio notification area update completion information to the second SIM card. For example, the radio notification area update completion information can be carried in radio resource control reconfiguration signaling (Reconfiguration) and sent to the second SIM card. Based on the radio resource control reconfiguration signaling, on the one hand, the second SIM card can disconnect an RRC connection with the first base station to establish the RRC connection with the second base station; on the other hand, the second SIM card can obtain the radio notification area update completion information from the radio resource control reconfiguration signaling, and send the radio notification area update completion information to the first SIM card.

In the related art, it is necessary for the second base station to restore the first SIM card to the disconnected state by sending the radio resource control release signaling (RRCRelease) to the first SIM card, and the above radio notification area update completion information is carried in the radio resource control release signaling in the related art. In this embodiment, it is not necessary to change the state of the first SIM card, so that it is not necessary for the second base station to send the radio resource control release signaling to the first SIM card to restore the first SIM card to the disconnected state, thereby omitting this step, simplifying the process that the base station communicates with the SIM card, and saving communication resources. In order to send the radio notification area update completion information to the first SIM card, the radio notification area update completion information can be carried in the radio resource control reconfiguration signaling and sent to the second SIM card according to the above embodiment, and then forwarded to the first SIM card through the second SIM card.

Figure 5:
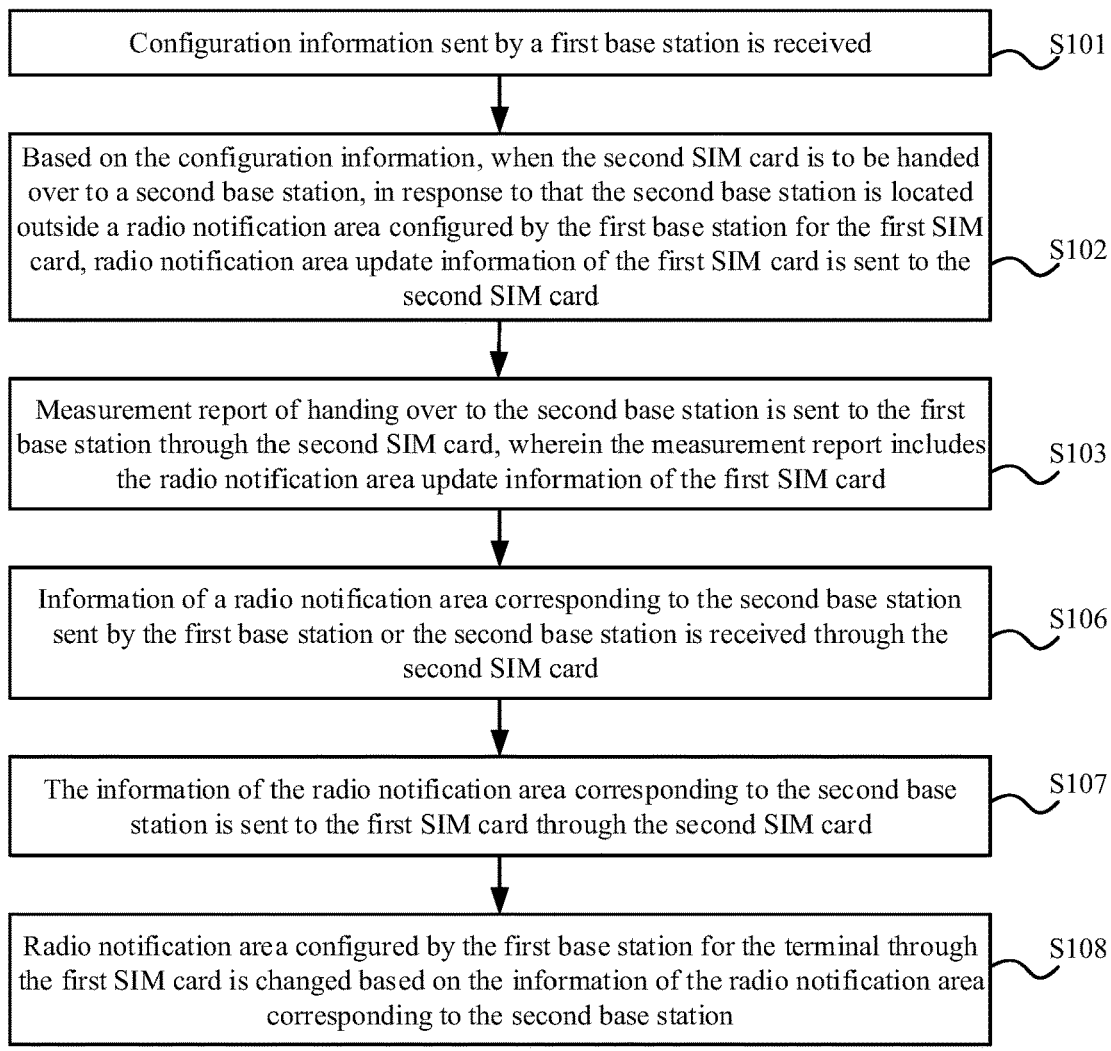
FIG. 5 is a schematic flowchart illustrating a method for updating a radio notification area according to an embodiment of the present disclosure.

FIG. 5 is a schematic flowchart illustrating a method for updating a radio notification area according to an embodiment of the present disclosure. As shown in FIG. 5, the method further includes steps S106 to S108.

In step S106, information of a second radio notification area corresponding to the second base station sent by the first base station or the second base station is received through the second SIM card.

In step S107, the information of the second radio notification area corresponding to the second base station is sent to the first SIM card through the second SIM card.

In step S108, a first radio notification area configured by the first base station for the terminal through the first SIM card is changed based on the information of the second radio notification area corresponding to the second base station.

In one embodiment, the second base station can send the information of the second radio notification area corresponding to the second base station to the first SIM card, so that the first SIM card can update the first radio notification area configured by the first base station to the second radio notification area corresponding to the second base station. The second base station can send the information of the second radio notification area corresponding to the second base station to the first SIM card after receiving the context information of the first SIM card.

In one embodiment, when or after the communication connection is established with the second SIM card, the second base station can first send the information of the second radio notification area corresponding to the second base station to the second SIM card, and then the second SIM card can send the radio notification area update completion information to the first SIM card.

In one embodiment, the second base station can first send the information of the second radio notification area corresponding to the second base station to the first base station, and then the first base station can send the information of the second radio notification area corresponding to the second base station to the second SIM card. For example, the information of the radio notification area corresponding to the second base station can be carried in the radio resource control reconfiguration signaling, and sent to the second SIM card. Based on the radio resource control reconfiguration signaling, on the one hand, the second SIM card can disconnect an RRC connection with the first base station to establish the RRC connection with the second base station; on the other hand, the second SIM card can obtain the information of the second radio notification area corresponding to the second base station from the radio resource control reconfiguration signaling, and send the information of the second radio notification area corresponding to the second base station to the first SIM card.

Figure 6:
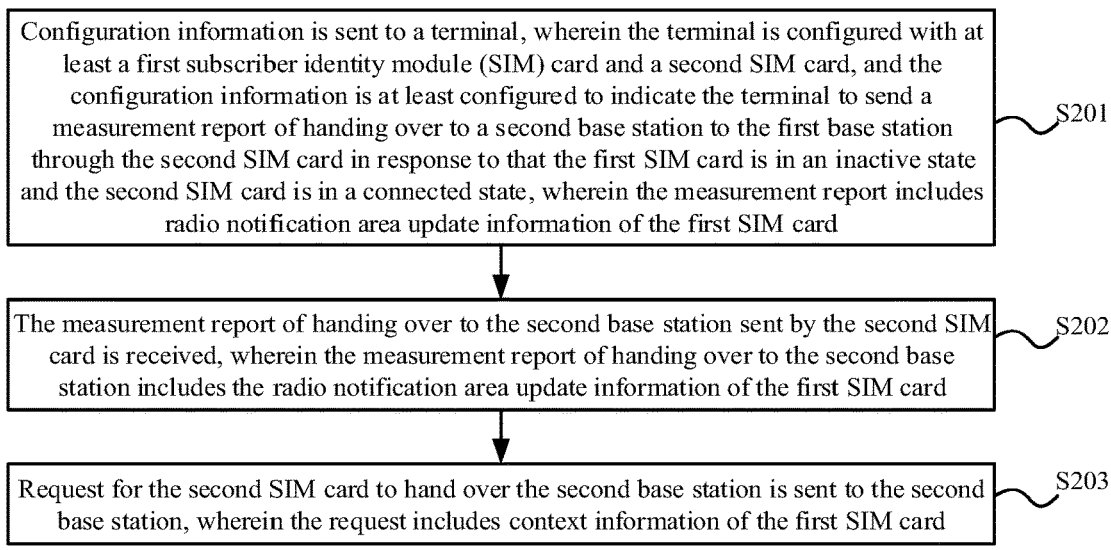
FIG. 6 is a schematic flowchart illustrating a method for updating a radio notification area according to an embodiment of the present disclosure.

FIG. 6 is a schematic flowchart illustrating a method for updating a radio notification area according to an embodiment of the present disclosure. The method for updating the radio notification area shown in this embodiment can be applied to a base station. The base station can be a 5G base station, and the base station can be the first base station in the above embodiments and communicate with the terminal and the second base station in the above embodiments. The terminal includes, but is not limited to, an electronic device such as a mobile phone, a tablet computer, a wearable device, and the like.

As shown in FIG. 6, the method for updating the radio notification area can include the following steps S201 to S203.

In step S201, configuration information is sent to a terminal, wherein the terminal is configured with at least a first subscriber identity module (SIM) card and a second SIM card. The configuration information is at least configured to indicate the terminal to send a measurement report of handing over to a second base station to the first base station through the second SIM card in response to the first SIM card being in an inactive state. The second SIM card is in a connected state, wherein the measurement report includes radio notification area update information of the first SIM card.

In step S202, the measurement report of handing over to the second base station sent by the second SIM card is received, wherein the measurement report of handing over to the second base station includes the radio notification area update information of the first SIM card.

In step S203, a request (HANDOVER REQUEST) for the second SIM card to hand over to the second base station is sent to the second base station, wherein the request includes context information of the first SIM card.

In one embodiment, the first SIM card and the second SIM card in the terminal can be in different states; for example, the first SIM card is in an inactive state, and the second SIM card is in a connected state. For the first SIM card in the inactive state, the first base station can configure a radio notification area for the terminal.

In this embodiment, the base station can be used as the first base station to send the configuration information to the terminal to instruct the terminal through the configuration information, and send the measurement report of handing over to the second base station to the first base station through the second SIM card, wherein the measurement report includes the radio notification area update information of the first SIM card.

Based on the configuration information, in response to the first SIM card being in the inactive state and the second SIM card being in the connected state, when the second SIM card is to be handed over to the second base station, the terminal can determine whether the second base station is located outside the first radio notification area configured by the first base station for the first SIM card. If the second base station is located outside the first radio notification area configured by the first base station for the first SIM card, the terminal can send the radio notification area update information of the first SIM card to the second SIM card. Further, when it is necessary to be handed over to the second base station, the second SIM card can send the measurement report to the first base station, and the measurement report can carry the radio notification area update information of the first SIM card.

Further, the first base station can also send a request for the second SIM card to hand over the second base stations to the second base station, wherein the request includes the context information of the first SIM card.

Accordingly, it is not necessary for the first SIM card to send the radio notification area update information to the second base station or temporarily adjust the state of the first SIM card, thereby reducing the number of times that the terminal communicates with the base station. Further, the context information of the first SIM card can be carried by the request of handing over the second base station to send to the second base station, without the second base station requesting the context information of the first SIM card from the first base station, thereby reducing the number of times that the first base station communicates with the second base station, simplifying the communication flow, and saving communication resources.

Figure 7:
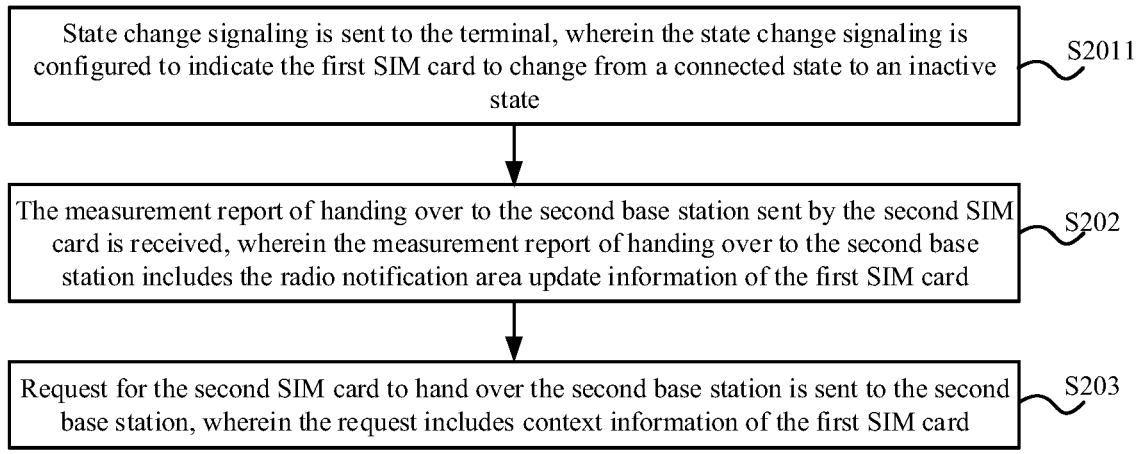
FIG. 7 is a schematic flowchart illustrating a method for updating a radio notification area according to an embodiment of the present disclosure.

FIG. 7 is a schematic flowchart illustrating a method for updating a radio notification area according to an embodiment of the present disclosure. As shown in FIG. 7, sending configuration information to the terminal includes step S2011.

In step S2011, state change signaling is sent to the terminal, wherein the state change signaling is configured to indicate the first SIM card to change from a connected state to an inactive state.

In one embodiment, the base station can send the state change signaling to the terminal to change the first SIM card in the terminal from the connected state to the inactive state, and the above configuration information can be carried in the state change signaling. Therefore, it is not necessary for the base station to send the above configuration information to the terminal through a single signaling, thereby simplifying the communication flow.

Figure 8:
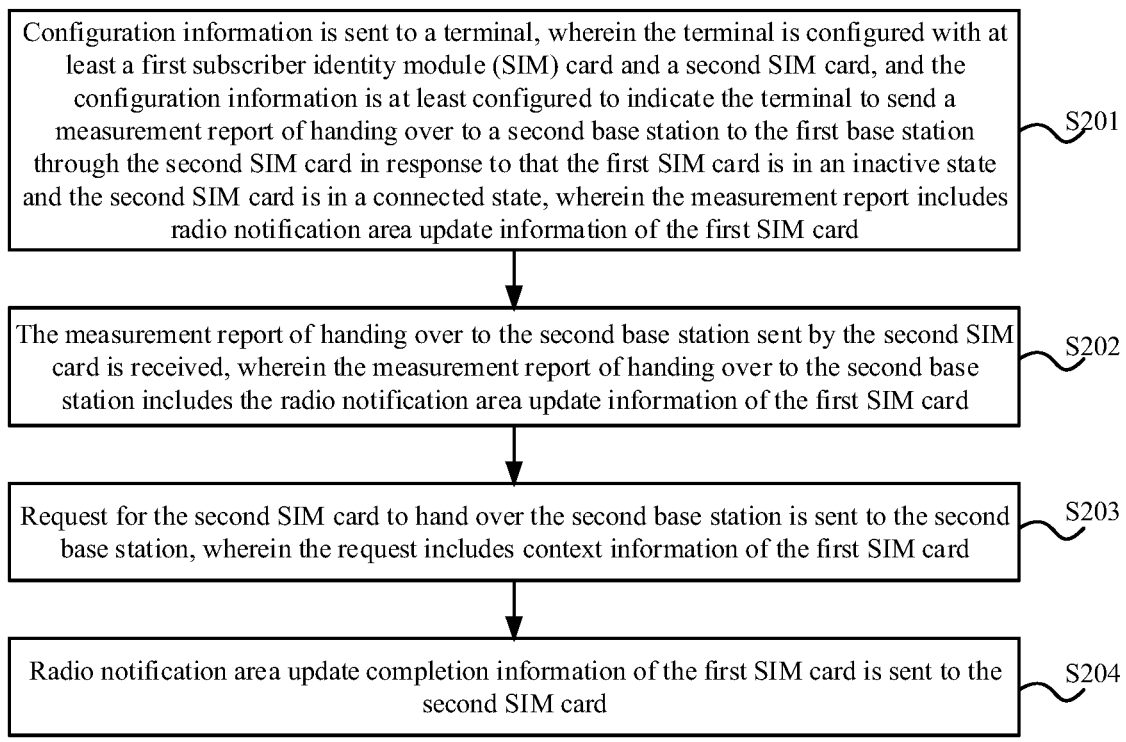
FIG. 8 is a schematic flowchart illustrating a method for updating a radio notification area according to an embodiment of the present disclosure.

FIG. 8 is a schematic flowchart illustrating a method for updating a radio notification area according to an embodiment of the present disclosure. As shown in FIG. 8, the method further includes step S204.

In step S204, the radio notification area update completion information of the first SIM card is sent to the second SIM card.

In one embodiment, the second base station can first send the radio notification area update completion information of the first SIM card to the first base station, and then the first base station can send the radio notification area update completion information of the first SIM card to the second SIM card. For example, the radio notification area update completion information of the first SIM card can be carried in radio resource control reconfiguration signaling, and sent to the second SIM card. Based on the radio resource control reconfiguration signaling, on the one hand, the second SIM card can disconnect an RRC connection with the first base station to establish the RRC connection with the second base station; on the other hand, the second SIM card can obtain the radio notification area update completion information from the radio resource control reconfiguration signaling, and send the radio notification area update completion information to the first SIM card.

Figure 9:
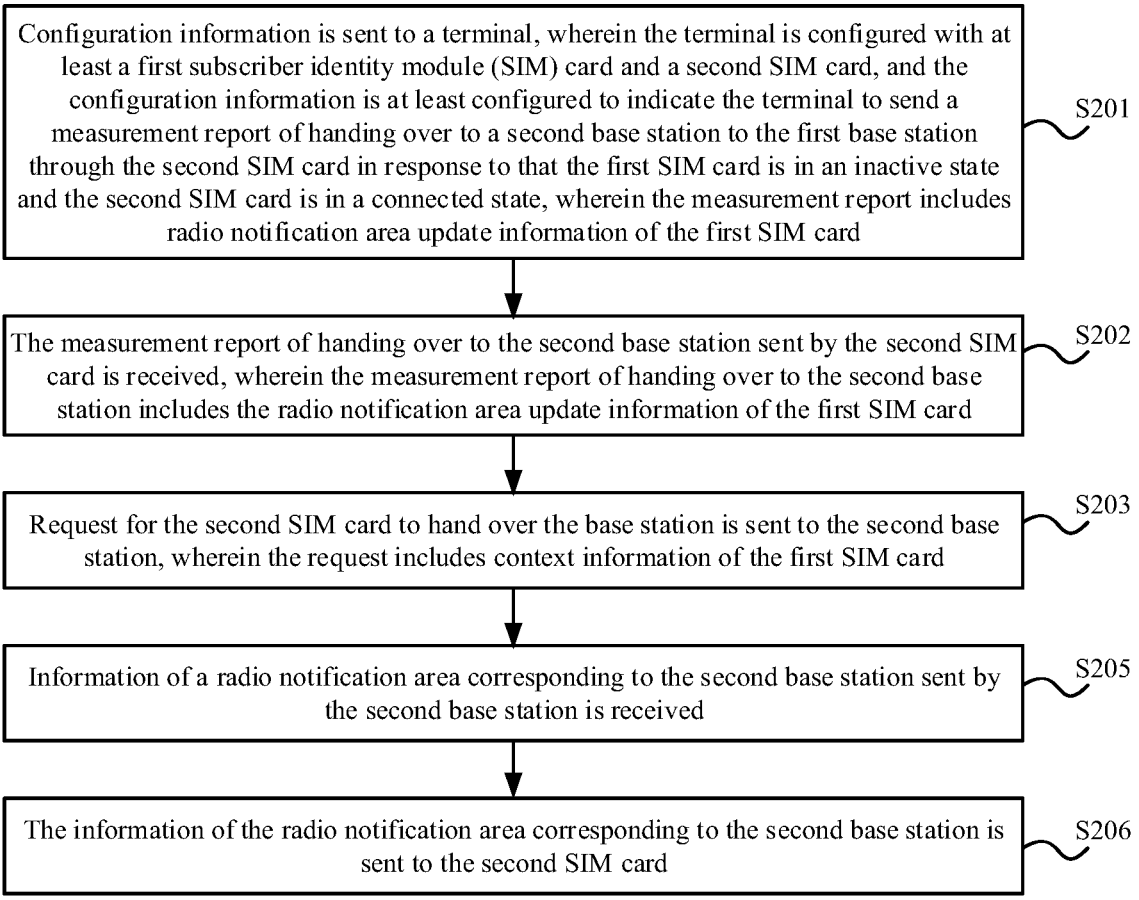
FIG. 9 is a schematic flowchart illustrating a method for updating a radio notification area according to an embodiment of the present disclosure.

FIG. 9 is a schematic flowchart illustrating a method for updating a radio notification area according to an embodiment of the present disclosure. As shown in FIG. 9, the method further includes steps S205 to S206.

In step S205, information of a second radio notification area corresponding to the second base station sent by the second base station is received.

In step S206, the information of the second radio notification area corresponding to the second base station is sent to the second SIM card.

In one embodiment, the second base station can first send the information of the second radio notification area corresponding to the second base station to the first base station, and then the first base station can send the information of the second radio notification area corresponding to the second base station to the second SIM card. For example, the information of the second radio notification area corresponding to the second base station can be carried in radio resource control reconfiguration signaling, and sent to the second SIM card. Based on the radio resource control reconfiguration signaling, on the one hand, the second SIM card can disconnect an RRC connection with the first base station to establish the RRC connection with the second base station; on the other hand, the second SIM card can obtain the information of the second radio notification area corresponding to the second base station from the radio resource control reconfiguration signaling, and send the information of the second radio notification area corresponding to the second base station to the first SIM card.

Figure 10:
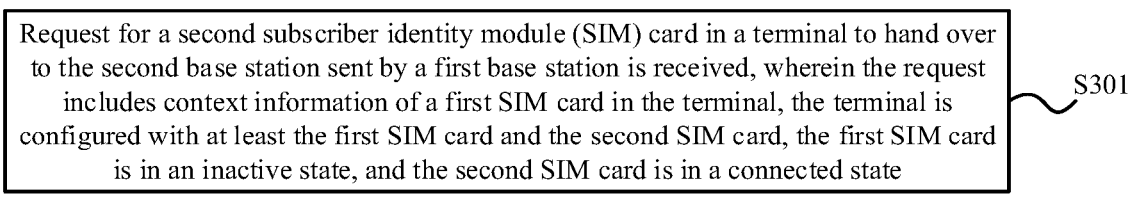
FIG. 10 is a schematic flowchart illustrating a method for updating a radio notification area according to an embodiment of the present disclosure.

FIG. 10 is a schematic flowchart illustrating a method for updating a radio notification area according to an embodiment of the present disclosure. The method for updating the radio notification area shown in this embodiment can be applied to a base station. The base station can be a 5G base station, and the base station can be the second base station in the above embodiments and communicate with the terminal and the first base station in the above embodiments. The terminal includes, but is not limited to, an electronic device such as a mobile phone, a tablet computer, a wearable device, and the like.

As shown in FIG. 10, the method for updating the radio notification area can include the following step S301.

In step S301, a request for a second subscriber identity module (SIM) card in a terminal to hand over to the second base station sent by a first base station is received, wherein the request includes context information of a first SIM card in the terminal, the terminal is configured with at least the first SIM card and the second SIM card, the first SIM card is in an inactive state, and the second SIM card is in a connected state.

In this embodiment, the base station can be used as the first base station to send the configuration information to the terminal to instruct the terminal through the configuration information, and send the measurement report of handing over to the second base station to the first base station through the second SIM card, wherein the measurement report includes the radio notification area update information of the first SIM card.

Based on the configuration information, in response to the first SIM card being in the inactive state and the second SIM card being in the connected state, when the second SIM card is to be handed over from the first base station to the second base station, the terminal can determine whether the second base station is located outside the first radio notification area configured by the first base station for the first SIM card. If the second base station is located outside the first radio notification area configured by the first base station for the first SIM card, the terminal can send the radio notification area update information of the first SIM card to the second SIM card. Further, when it is necessary to be handed over to the second base station, the second SIM card can send the measurement report to the first base station, and the measurement report can carry the radio notification area update information of the first SIM card.

Further, the first base station can also send a request for the second SIM card to hand over the second base stations to the second base station, wherein the request includes the context information of the first SIM card.

Accordingly, it is not necessary for the first SIM card to send the radio notification area update information to the second base station or temporarily adjust the state of the first SIM card, thereby reducing the number of times the terminal communicates with the base station. Further, the context information of the first SIM card can be carried by the request of handing over the second base station to send to the second base station without the second base station requesting the context information of the first SIM card from the first base station, thereby reducing the number of times that the first base station communicates with the second base station, simplifying the communication flow, and saving communication resources.

Figure 11:
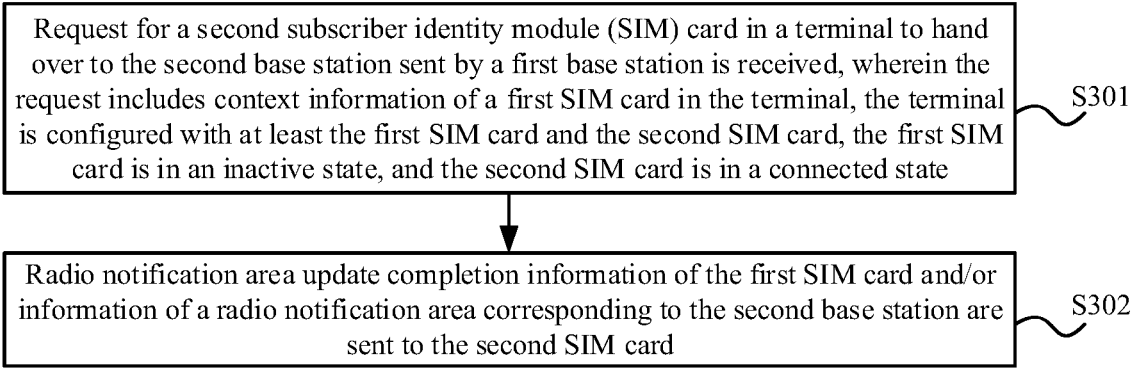
FIG. 11 is a schematic flowchart illustrating a method for updating a radio notification area according to an embodiment of the present disclosure.

FIG. 11 is a schematic flowchart illustrating a method for updating a radio notification area according to an embodiment of the present disclosure. As shown in FIG. 11, the method further includes step S302.

In step S302, the radio notification area update completion information of the first SIM card and/or information of a second radio notification area corresponding to the second base station is sent to the second SIM card.

When or after the communication connection is established with the second SIM card, the second base station can first send the radio notification area update completion information and/or the information of the second radio notification area corresponding to the second base station to the second SIM card. Then the second SIM card can send the radio notification area update completion information to the first SIM card.

Figure 12:
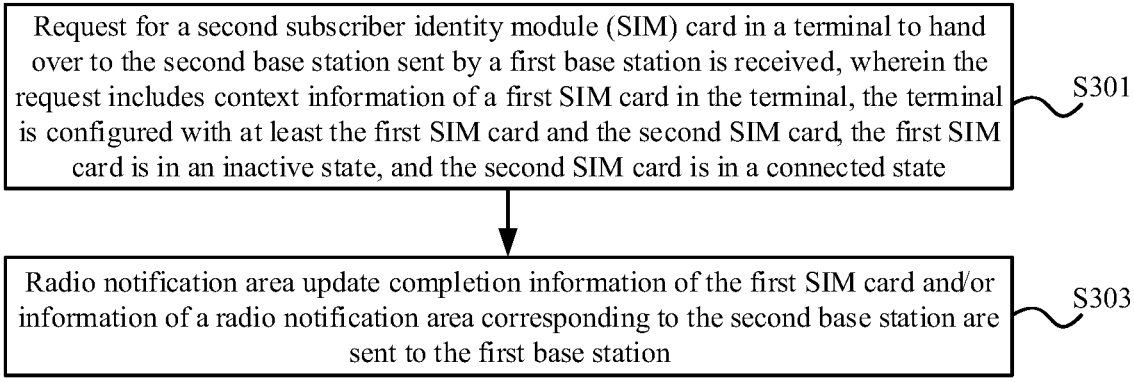
FIG. 12 is a schematic flowchart illustrating a method for updating a radio notification area according to an embodiment of the present disclosure.

FIG. 12 is a schematic flowchart illustrating a method for updating a radio notification area according to an embodiment of the present disclosure. As shown in FIG. 12, the method further includes step S303.

In step S303, the radio notification area update completion information of the first SIM card and/or information of a second radio notification area corresponding to the second base station is sent to the first base station.

In one embodiment, the second base station can first send the radio notification area update completion information and/or the information of the second radio notification area corresponding to the second base station to the first base station, and then the first base station can send the radio notification area update completion information and/or the information of the second radio notification area corresponding to the second base station to the second SIM card. For example, the radio notification area update completion information and/or the information of the second radio notification area corresponding to the second base station can be carried in radio resource control reconfiguration signaling, and sent to the second SIM card. Based on the radio resource control reconfiguration signaling, on the one hand, the second SIM card can disconnect an RRC connection with the first base station to establish the RRC connection with the second base station; on the other hand, the second SIM card can obtain the radio notification area update completion information and/or the information of the second radio notification area corresponding to the second base station from the radio resource control reconfiguration signaling, and send the information of the second radio notification area corresponding to the second base station to the first SIM card.

Figure 13:
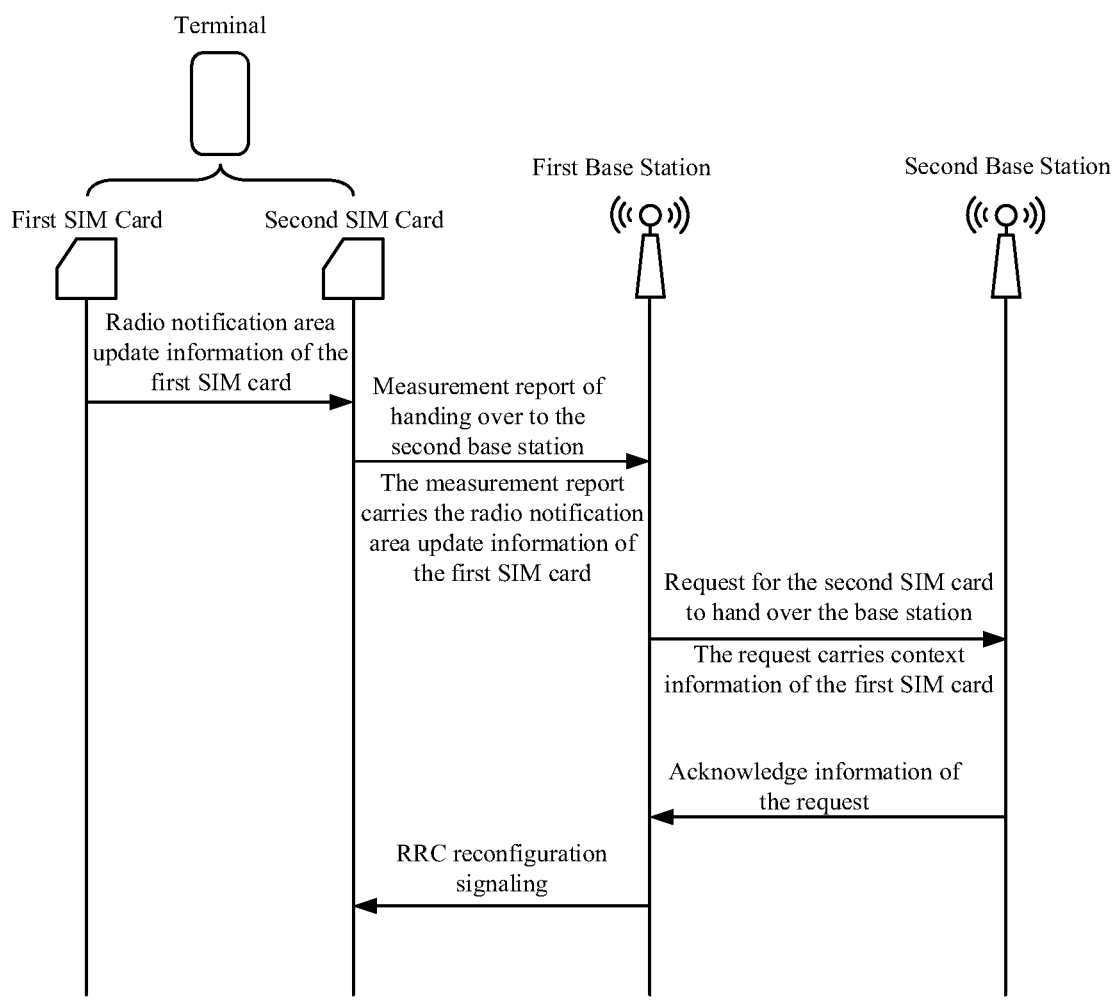
FIG. 13 is a schematic diagram illustrating an interaction between a terminal and a base station according to an embodiment of the present disclosure.

FIG. 13 is a schematic diagram illustrating an interaction between a terminal and a base station according to an embodiment of the present disclosure.

In one embodiment, a first base station can send configuration information for a terminal in advance. Based on the configuration information, in response to a first SIM card being in an inactive state and a second SIM card being in a connected state, when the second SIM card is to be handed over to a second base station, the first SIM card can send radio notification area update information of the first SIM card to the second SIM card.

The second SIM card can send a measurement report of handing over to the second base station to the first base station, and the radio notification area update information of the first SIM card can be carried in the measurement report.

The first base station can send a request for the second SIM card to hand over the second base station to the second base station (which is used to request the second SIM card to hand over to the second base station), and context information of the first SIM card can be carried in the request (the first base station stores the context information of the first SIM card in advance).

When the second SIM card is allowed to hand over to the base station, the second base station can send handover request acknowledge information to the first base station. The first base station can send RRC reconfiguration signaling to the second SIM card, so that the second SIM card can establish a connection with the second base station.

Radio notification area update completion information of the first SIM card and/or information of the first radio notification area corresponding to the first base station can be carried in the handover request acknowledge information and RRC reconfiguration signaling, and the second SIM card can send the radio notification area update completion information and/or the information of the first radio notification area corresponding to the first base station to the first SIM card.

Corresponding to the aforementioned embodiments of the method for updating the radio notification area, the present disclosure further provides embodiments of an apparatus for updating a radio notification area.

Figure 14:
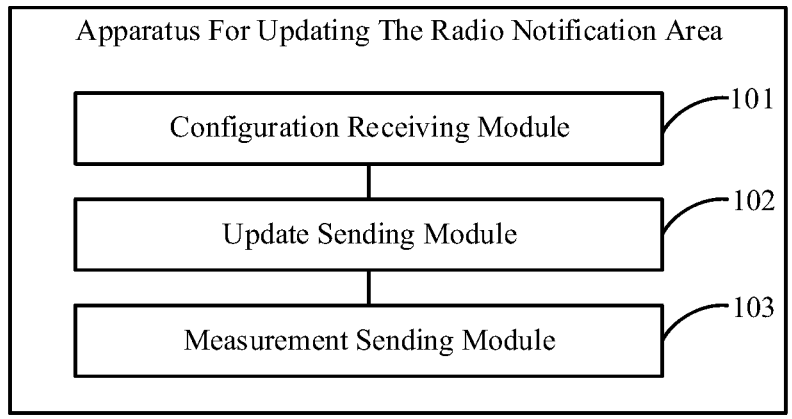
FIG. 14 is a schematic block diagram illustrating an apparatus for updating a radio notification area according to an embodiment of the present disclosure.

FIG. 14 is a schematic block diagram illustrating an apparatus for updating a radio notification area according to an embodiment of the present disclosure. The apparatus for updating the radio notification area shown in this embodiment can be applied to a terminal. The terminal can be used as user equipment to communicate with a base station, wherein the base station can be a 5G base station, and the terminal includes, but is not limited to, an electronic device such as a mobile phone, a tablet computer, a wearable device, and the like.

The terminal is configured with at least a first subscriber identity module (SIM) card and a second SIM card. It should be noted that the first SIM card and the second SIM card are not two specific SIM cards, but any two different SIM cards in the terminal.

As shown in FIG. 14, the apparatus for updating the radio notification area can include:

a configuration receiving module 101 configured to receive configuration information sent by a first base station;

an update sending module 102 configured to, based on the configuration information, when the second SIM card is to be handed over to a second base station, in response to that the second base station is located outside a first radio notification area configured by the first base station for the first SIM card, send radio notification area update information of the first SIM card to the second SIM card; and a measurement sending module 103 configured to, through the second SIM card and to the first base station, send a measurement report of handing over to the second base station, wherein the measurement report includes the radio notification area update information of the first SIM card.

Optionally, the configuration receiving module 101 is configured to receive state change signaling sent by the first base station, wherein the state change signaling is configured to indicate the first SIM card to change from a connected state to an inactive state; and obtain the configuration information from the state change signaling.

Figure 15:
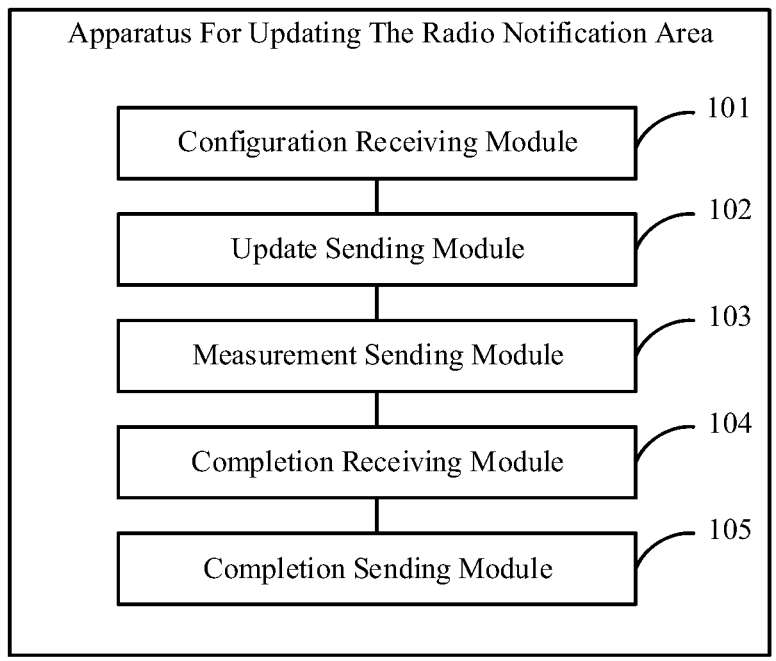
FIG. 15 is a schematic block diagram illustrating an apparatus for updating a radio notification area according to an embodiment of the present disclosure.

FIG. 15 is a schematic block diagram illustrating an apparatus for updating a radio notification area according to an embodiment of the present disclosure. As shown in FIG. 15, the apparatus further includes:

a completion receiving module 104 configured to receive, through the second SIM card, radio notification area update completion information sent by the first base station or the second base station; and a completion sending module 105 configured to send, through the second SIM card and to the first SIM card, the radio notification area update completion information.

Figure 16:
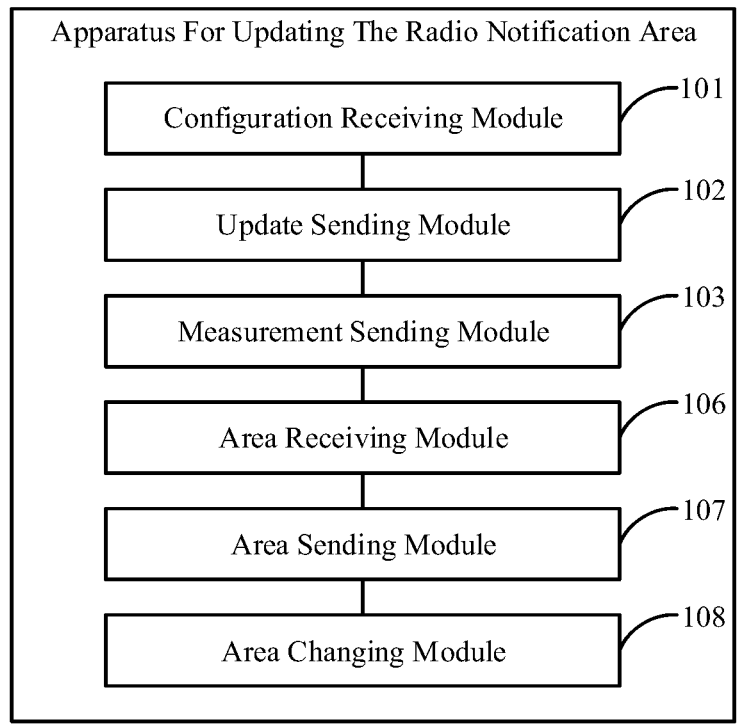
FIG. 16 is a schematic block diagram illustrating an apparatus for updating a radio notification area according to an embodiment of the present disclosure.

FIG. 16 is a schematic block diagram illustrating an apparatus for updating a radio notification area according to an embodiment of the present disclosure. As shown in FIG. 16, the apparatus further includes:

an area receiving module 106 configured to receive, through the second SIM card, information of a second radio notification area corresponding to the second base station sent by the first base station or the second base station;

an area sending module 107 configured to send, through the second SIM card and to the first SIM card, the information of the second radio notification area corresponding to the second base station; and an area changing module 108 configured to change, through the first SIM card, a first radio notification area configured by the first base station for the terminal based on the information of the second radio notification area corresponding to the second base station.

Figure 17:
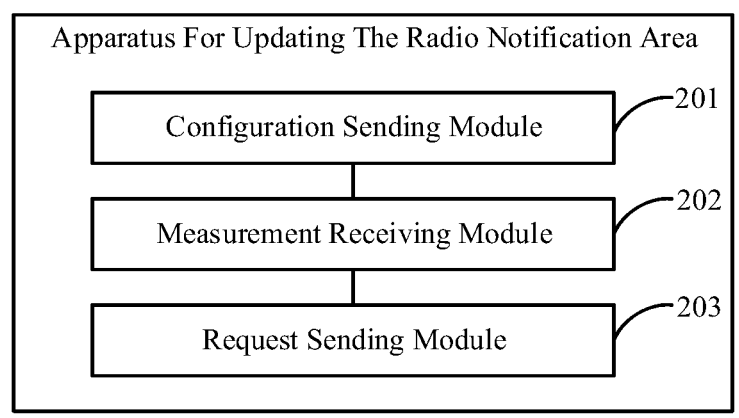
FIG. 17 is a schematic block diagram illustrating an apparatus for updating a radio notification area according to an embodiment of the present disclosure.

FIG. 17 is a schematic block diagram illustrating an apparatus for updating a radio notification area according to an embodiment of the present disclosure. The apparatus for updating the radio notification area shown in this embodiment can be applied to a base station. The base station can be a 5G base station, and the base station can be the first base station in the above embodiments and communicate with the terminal and the second base station in the above embodiments. The terminal includes, but is not limited to, an electronic device such as a mobile phone, a tablet computer, a wearable device, and the like.

As shown in FIG. 17, the apparatus for updating the radio notification area can include:

a configuration sending module 201 configured to send configuration information to a terminal, wherein the terminal is configured with at least a first subscriber identity module (SIM) card and a second SIM card, and the configuration information is at least configured to indicate the terminal to send a measurement report of handing over to a second base station to the first base station through the second SIM card in response to that the first SIM card is in an inactive state and the second SIM card is in a connected state, wherein the measurement report includes radio notification area update information of the first SIM card;

a measurement receiving module 202 configured to receive the measurement report of handing over to the second base station sent by the second SIM card, wherein the measurement report of handing over to the second base station includes the radio notification area update information of the first SIM card; and a request sending module 203 configured to send a request for the second SIM card to hand over the second base station to the second base station, wherein the request includes context information of the first SIM card.

Optionally, the configuration sending module 201 is configured to send state change signaling to the terminal, wherein the state change signaling is configured to indicate the first SIM card to change from a connected state to an inactive state.

Figure 18:
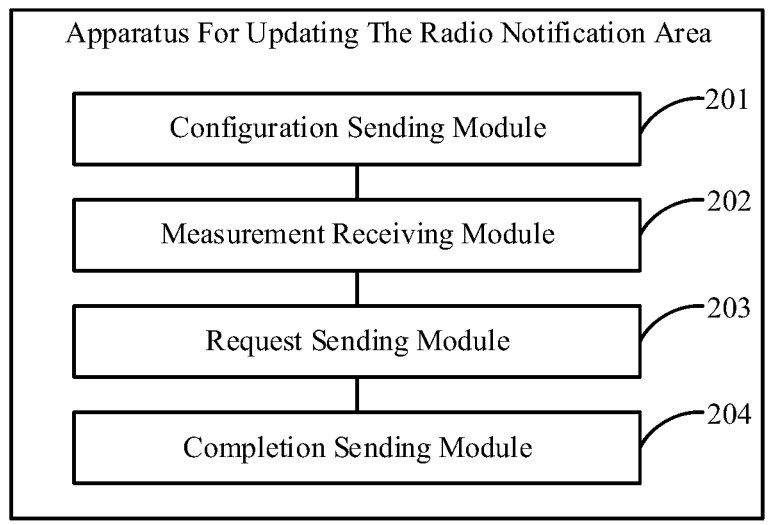
FIG. 18 is a schematic block diagram illustrating an apparatus for updating a radio notification area according to an embodiment of the present disclosure.

FIG. 18 is a schematic block diagram illustrating an apparatus for updating a radio notification area according to an embodiment of the present disclosure. As shown in FIG. 18, the apparatus further includes:

a completion sending module 204 configured to send radio notification area update completion information of the first SIM card to the second SIM card.

Figure 19:
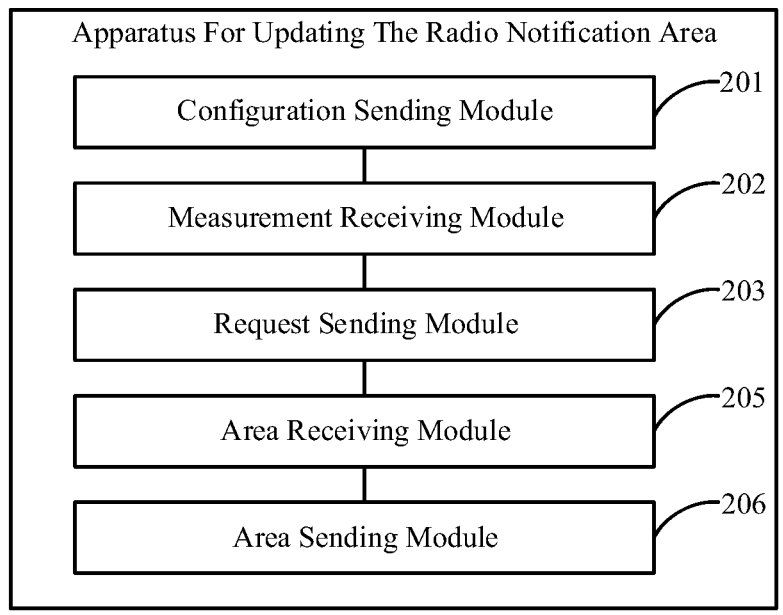
FIG. 19 is a schematic block diagram illustrating an apparatus for updating a radio notification area according to an embodiment of the present disclosure.

FIG. 19 is a schematic block diagram illustrating an apparatus for updating a radio notification area according to an embodiment of the present disclosure. As shown in FIG. 19, the apparatus further includes:

an area receiving module 205 configured to receive information of a second radio notification area corresponding to the second base station sent by the second base station; and an area sending module 206 configured to send the information of the second radio notification area corresponding to the second base station to the second SIM card.

Figure 20:
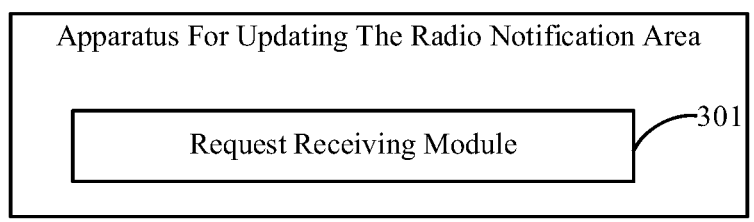
FIG. 20 is a schematic block diagram illustrating an apparatus for updating a radio notification area according to an embodiment of the present disclosure.

FIG. 20 is a schematic block diagram illustrating an apparatus for updating a radio notification area according to an embodiment of the present disclosure. The apparatus for updating the radio notification area shown in this embodiment can be applied to a base station. The base station can be a 5G base station, and the base station can be the second base station in the above embodiments and communicate with the terminal and the first base station in the above embodiments. The terminal includes, but is not limited to, an electronic device such as a mobile phone, a tablet computer, a wearable device, and the like.

As shown in FIG. 20, the apparatus for updating the radio notification area can include:

a request receiving module 301 configured to receive a request for a second subscriber identity module (SIM) card in a terminal to hand over to the second base station sent by a first base station, wherein the request includes context information of a first SIM card in the terminal, the terminal is configured with at least the first SIM card and the second SIM card, the first SIM card is in an inactive state, and the second SIM card is in a connected state.

Figure 21:
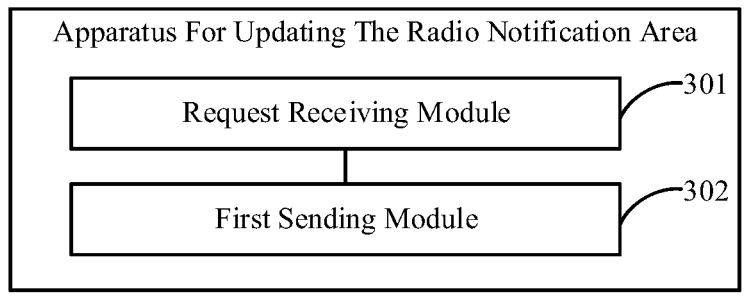
FIG. 21 is a schematic block diagram illustrating an apparatus for updating a radio notification area according to an embodiment of the present disclosure.

FIG. 21 is a schematic block diagram illustrating an apparatus for updating a radio notification area according to an embodiment of the present disclosure. As shown in FIG. 21, the apparatus further includes:

a first sending module 302 configured to send radio notification area update completion information of the first SIM card and/or information of a second radio notification area corresponding to the second base station to the second SIM card.

Figure 22:
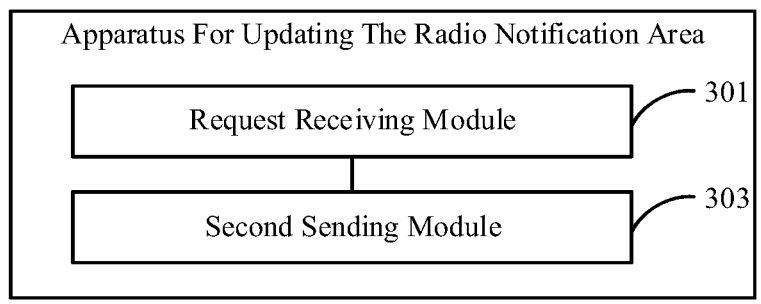
FIG. 22 is a schematic block diagram illustrating an apparatus for updating a radio notification area according to an embodiment of the present disclosure.

FIG. 22 is a schematic block diagram illustrating an apparatus for updating a radio notification area according to an embodiment of the present disclosure. As shown in FIG. 22, the apparatus further includes:

a second sending module 303 configured to send radio notification area update completion information of the first SIM card and/or information of a second radio notification area corresponding to the second base station to the first base station.

Regarding the apparatus in the above embodiment, the specific manner in which each module performs the operation has been described in detail in the embodiment of the method, which will not be elaborated here.

For the apparatus embodiment, since it basically corresponds to the method embodiment, the relevant part may refer to the part of the description of the method embodiment. The apparatus embodiments described above are merely illustrative, where the units described as separate components may or may not be physically separated, and the components displayed as units may or may not be physical units. That is, they may be located in one place or may be distributed to a plurality of network units. Some or all of the modules may be selected according to actual needs, to achieve the objectives of the solutions of the present disclosure. Those skilled in the art may understand and implement without creative labor.

According to the embodiments of the present disclosure, there is provided an electronic device, including:

a processor; and a memory for storing instructions executable by the processor, wherein the processor is configured to implement the steps of the method for updating the radio notification area described in any of the above embodiments.

The electronic device can be a terminal or a base station.

According to the embodiments of the present disclosure, there is provided a computer readable storage medium storing a computer program, wherein the computer program, when executed by a processor, causing the processor to implement the steps of the method for updating the radio notification area described in any of the above embodiments.

Figure 23:
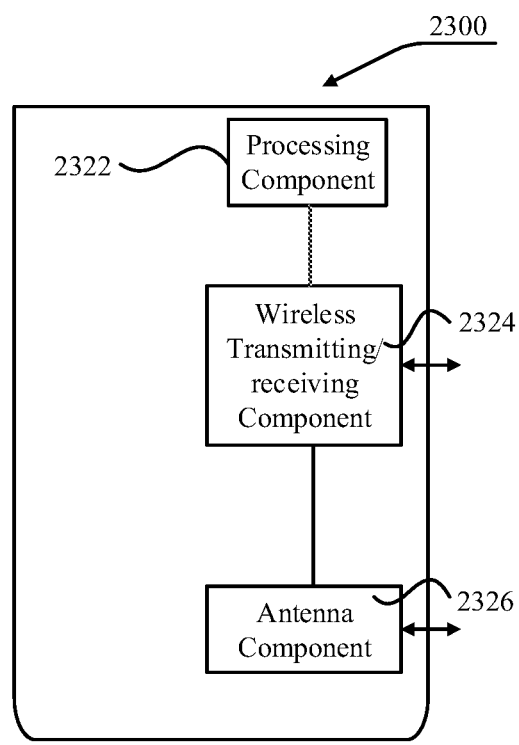
FIG. 23 is a schematic block diagram illustrating an apparatus for updating a radio notification area according to an embodiment of the present disclosure.

As shown in FIG. 23, FIG. 23 is a schematic block diagram illustrating an apparatus 2300 for updating a radio notification area according to an embodiment of the present disclosure. The apparatus 2300 can be provided as a base station. Referring to FIG. 23, the apparatus 2300 includes a processing component 2322, a wireless sending/receiving component 2324, an antenna component 2326 and a signal processing part specific to a wireless interface. The processing component 2322 can further include one or more processors. One of the processors in the processing component 2322 can be configured to implement the method for updating the radio notification area described in any of the above embodiments.

Figure 24:
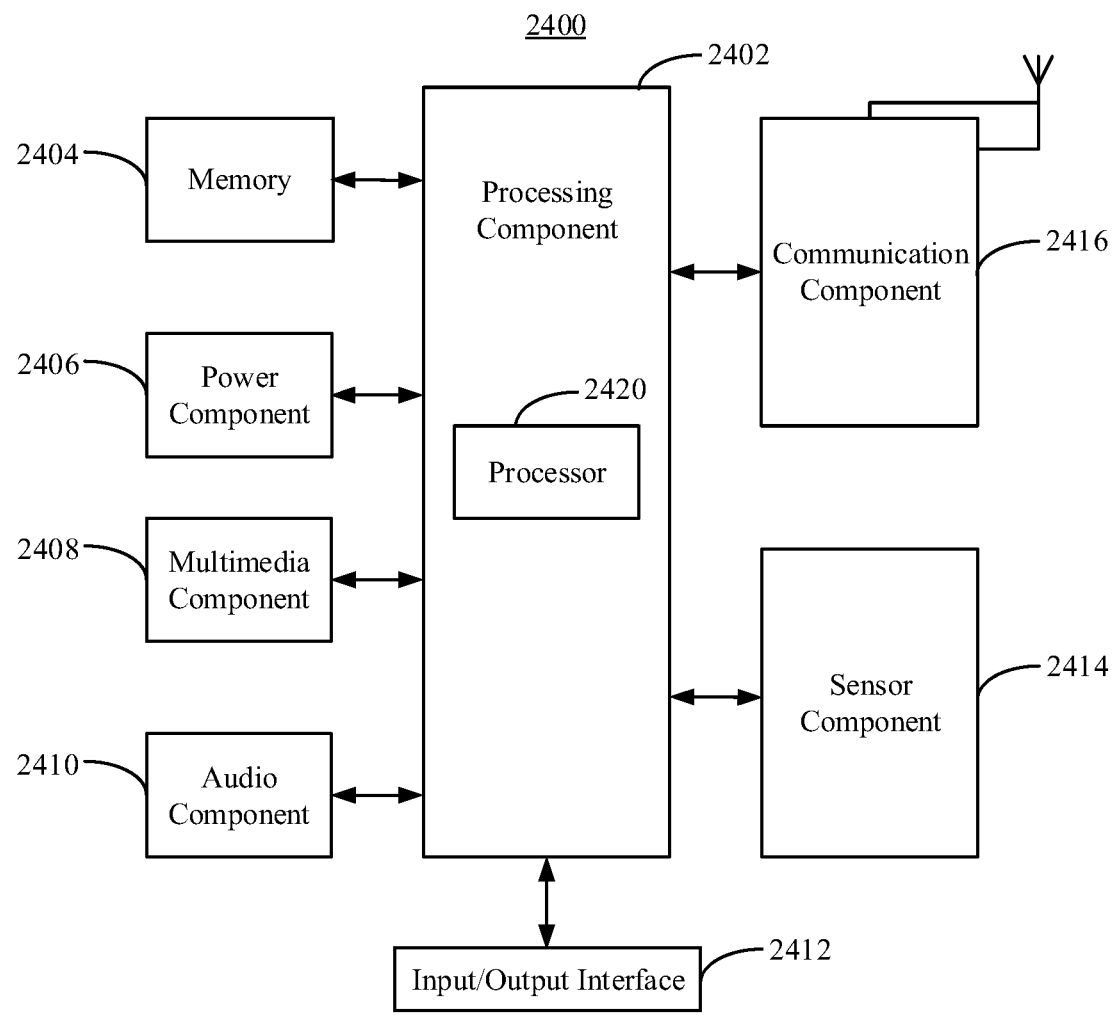
FIG. 24 is a schematic block diagram illustrating an apparatus for updating a radio notification area according to an embodiment of the present disclosure.

FIG. 24 is a schematic block diagram illustrating an apparatus 2400 for updating a radio notification area according to an embodiment of the present disclosure. For example, the apparatus 2400 can be provided as a terminal. The terminal can be a mobile telephone, a computer, a digital broadcasting terminal, a message receiving and sending device, a game console, a tablet device, a medical device, a fitness device, a personal digital assistant, and the like.

Referring to FIG. 24, the apparatus 2400 may include one or more of the following components: a processing component 2402, a memory 2404, a power supply component 2406, a multimedia component 2408, an audio component 2410, an input/output (I/O) interface 2412, a sensor component 2414 and a communication component 2416.

The processing component 2402 generally controls the overall operations of the apparatus 2400, such as operations associated with display, phone calls, data communications, camera operations, and recording operations. The processing component 2402 may include one or more processors 2420 to execute instructions to complete all or part of the steps of the above methods. In addition, the processing component 2402 may include one or more modules that facilitate the interaction between the processing component 2402 and other components. For example, the processing component 2402 may include a multimedia module to facilitate the interaction between the multimedia component 2408 and the processing component 2402.

The memory 2404 is to store various types of data to support the operation of the apparatus 2400. Examples of such data include instructions for any application or method operated on the apparatus 2400, contact data, phonebook data, messages, pictures, videos, and so on. The memory 2404 may be implemented by any type of volatile or non-volatile storage devices or a combination thereof, such as a Static Random-Access Memory (SRAM), an Electrically-Erasable Programmable Read Only Memory (EEPROM), an Erasable Programmable Read Only Memory (EPROM), a Programmable read-only memory (PROM), a Read Only Memory (ROM), a magnetic memory, a flash memory, a magnetic or optical disk.

The power supply component 2406 provides power to different components of the apparatus 2400. The power supply component 2406 may include a power management system, one or more power supplies, and other components associated with generating, managing, and distributing power for the apparatus 2400.

The multimedia component 2408 includes a screen providing an output interface between the apparatus 2400 and a user. In some embodiments, the screen may include a Liquid Crystal Display (LCD) and a Touch Panel (TP). If the screen includes the TP, the screen may be implemented as a touch screen to receive input signals from the user. The TP may include one or more touch sensors to sense touches, swipes, and gestures on the TP. The touch sensors may sense not only the boundary of a touch or swipe but also the duration and pressure associated with the touch or swipe. In some embodiments, the multimedia component 2408 may include a front camera and/or a rear camera. The front camera and/or rear camera may receive external multimedia data when the apparatus 2400 is in an operating mode, such as a photographing mode or a video mode. Each of the front camera and the rear camera may be a fixed optical lens system or have focal length and optical zooming capability.

The audio component 2410 is configured to output and/or input an audio signal. For example, the audio component 2410 includes a microphone (MIC). When the apparatus 2400 is in an operating mode, such as a call mode, a recording mode, and a voice recognition mode, the MIC is to receive an external audio signal. The received audio signal may be further stored in the memory 2404 or sent via the communication component 2416. In some embodiments, the audio component 2410 further includes a speaker to output an audio signal.

The I/O interface 2412 may provide an interface between the processing component 2402 and peripheral interface modules. The above peripheral interface modules may include a keyboard, a click wheel, buttons and so on. These buttons may include but are not limited to a home button, a volume button, a starting button, and a locking button.

The sensor component 2414 includes one or more sensors to provide status assessments of various aspects for the apparatus 2400. For example, the sensor component 2414 may detect the on/off status of the apparatus 2400, and the relative positioning of a component; for example, the component is a display and a keypad of the apparatus 2400. The sensor component 2414 may also detect a change in the position of the apparatus 2400 or a component of the apparatus 2400, a presence or absence of contact between a user and the apparatus 2400, an orientation or an acceleration/deceleration of the apparatus 2400, and a change in temperature of the apparatus 2400. The sensor component 2414 may include a proximity sensor to detect the presence of a nearby object without any physical contact. The sensor component 2414 may further include an optical sensor, such as a Complementary Metal Oxide Semiconductor (CMOS) or Charge-coupled Device (CCD) image sensor which is used in imaging applications. In some embodiments, the sensor component 2414 may further include an acceleration sensor, a gyroscope sensor, a magnetic sensor, a pressure sensor, or a temperature sensor.

The communication component 2416 is to facilitate wired or wireless communication between the apparatus 2400 and other devices. The apparatus 2400 may access a wireless network that is based on a communication standard, such as Wi-Fi, 2G or 3G, or a combination thereof. In an exemplary embodiment, the communication component 2416 receives a broadcast signal or broadcast-associated information from an external broadcast management system via a broadcast channel. In an exemplary embodiment, the communication component 2416 further includes a Near Field Communication (NFC) module to facilitate short-range communications. For example, the NFC module may be implemented based on a Radio Frequency Identification (RFID) technology, an Infrared Data Association (IrDA) technology, an Ultra-Wide Band (UWB) technology, a Blue Tooth (BT) technology and other technologies.

In an exemplary embodiment, the apparatus 2400 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, microcontrollers, microprocessors, or other electronic components for performing the above method.

In an exemplary embodiment, there is also provided a non-transitory computer readable storage medium including instructions, such as the memory 2404 including instructions. The instructions may be executed by the processor 2420 of the apparatus 2400 to perform the above described methods. For example, the non-transitory computer readable storage medium may be a ROM, a Random Access Memory (RAM), a CD-ROM, a magnetic tape, a floppy disk, an optical data storage device, and the like.

Other implementations of the present disclosure will be apparent to those skilled in the art from consideration of the specification and practice of the present disclosure herein. The present disclosure is intended to cover any variations, uses, modifications, or adaptations of the present disclosure that follow the general principles thereof and include common knowledge or conventional technical means in the art that are not disclosed in the present disclosure. The specification and examples are considered as exemplary only, with a true scope and spirit of the present disclosure being indicated by the following claims.

It should be understood that the present disclosure is not limited to the above described structures shown in the drawings, and various modifications and changes can be made to the present disclosure without departing from the scope thereof. The scope of the present disclosure is to be limited only by the appended claims.

It should be noted that the relational terms such as "first" and "second" used herein are merely intended to distinguish one entity or operation from another entity or operation rather than to require or imply any such actual relation or order existing between these entities or operations. Also, the terms "including", "containing", or any variation thereof is intended to cover non-exclusive inclusion, so that a process, method, article, or device including a series of elements includes not only those elements but also other elements not listed explicitly or those elements inherent to such a process, method, article, or device. Without more limitations, an element defined by the statement "including a . . . " shall not be precluded from including additional same elements present in the process, method, article or device including the elements.

The methods and apparatuses provided by the embodiments of the present disclosure have been described in detail above. Specific examples are used herein to explain the principles and implementations of the present disclosure. The description of the above embodiments is only used to help understand methods and core ideas in the present disclosure. At the same time, those of ordinary skill in the art can apply some changes in the specific implementation and the scope of application based on the idea of the present disclosure. In conclusion, the content of the present specification should not be construed as any limitation to the present disclosure.

The invention claimed is:

1. A method for updating a radio notification area, being applicable to a terminal configured with at least a first subscriber identity module (SIM) card and a second SIM card, the method comprising:
receiving configuration information sent by a first base station;
when the second SIM card is to be handed over to a second base station, sending radio notification area update information of the first SIM card to the second SIM card based on the configuration information in response to that the second base station is located outside a first radio notification area configured by the first base station for the first SIM card; and
sending, through the second SIM card and to the first base station, a measurement report of handing over to the second base station, wherein the measurement report comprises the radio notification area update information of the first SIM card.

2. The method according to claim 1, wherein the receiving the configuration information sent by the first base station comprises:
receiving state change signaling sent by the first base station, wherein the state change signaling is configured to indicate the first SIM card to change from a connected state to an inactive state; and
obtaining the configuration information from the state change signaling.

3. The method according to claim 1, further comprising:
receiving, through the second SIM card, radio notification area update completion information sent by the first base station or the second base station; and
sending, through the second SIM card, the radio notification area update completion information to the first SIM card.

4. The method according to claim 1, further comprising:
receiving, through the second SIM card, information of a second radio notification area corresponding to the second base station sent by the first base station or the second base station;

sending, through the second SIM card, the information of the second radio notification area corresponding to the second base station to the first SIM card; and
changing, through the first SIM card, the first radio notification area configured by the first base station for the terminal based on the information of the second radio notification area corresponding to the second base station.

5. A method for updating a radio notification area, being applicable to a first base station, the method comprising:
sending configuration information to a terminal, wherein the terminal is configured with at least a first subscriber identity module (SIM) card and a second SIM card, and the configuration information is at least configured to indicate the terminal to send a measurement report of handing over to a second base station to the first base station through the second SIM card in response to that the first SIM card is in an inactive state and the second SIM card is in a connected state, wherein the measurement report comprises radio notification area update information of the first SIM card;
receiving the measurement report of handing over to the second base station sent by the second SIM card, wherein the measurement report of handing over to the second base station comprises the radio notification area update information of the first SIM card; and
sending a request for the second SIM card to hand over the second base station to the second base station, wherein the request comprises context information of the first SIM card.

6. The method according to claim 5, wherein the sending the configuration information to the terminal comprises:
sending state change signaling to the terminal, wherein the state change signaling is configured to indicate the first SIM card to change from the connected state to the inactive state.

7. The method according to claim 5, further comprising:
sending radio notification area update completion information of the first SIM card to the second SIM card.

8. The method according to claim 5, further comprising:
receiving information of a second radio notification area corresponding to the second base station sent by the second base station; and
sending the information of the second radio notification area corresponding to the second base station to the second SIM card.

9. A method for updating a radio notification area, being applicable to a second base station, the method comprising:
receiving a request for a second subscriber identity module (SIM) card in a terminal to hand over to the second base station sent by a first base station, wherein the request comprises context information of a first SIM card in the terminal, the terminal is configured with at least the first SIM card and the second SIM card, the first SIM card is in an inactive state, and the second SIM card is in a connected state.

10. The method according to claim 9, further comprising:
sending radio notification area update completion information of the first SIM card and/or information of a second radio notification area corresponding to the second base station to the second SIM card.

11. The method according to claim 9, further comprising:
sending radio notification area update completion information of the first SIM card and/or information of a second radio notification area corresponding to the second base station to the first base station.

12. An electronic device, comprising:

a processor; and a memory for storing instructions executable by the processor, wherein the processor is configured to implement the method for updating the radio notification area according to claim 1.

13. A non-transitory computer readable storage medium storing a computer program, wherein the computer program, when executed by a processor, causes the processor to implement the method for updating the radio notification area according to claim 1.

14. An electronic device, comprising:

a processor; and a memory for storing instructions executable by the processor, wherein the processor is configured to implement the method for updating the radio notification area according to claim 5.

15. An electronic device, comprising:

a processor; and a memory for storing instructions executable by the processor, wherein the processor is configured to implement the method for updating the radio notification area according to claim 9.

16. A non-transitory computer readable storage medium storing a computer program, wherein the computer program, when executed by a processor, causes the processor to implement the method for updating the radio notification area according to claim 5.

17. A non-transitory computer readable storage medium storing a computer program, wherein the computer program, when executed by a processor, causes the processor to implement the steps of the method for updating the radio notification area according to claim 9.

* * * * *

UNITED STATES PATENT AND TRADEMARK OFFICE
CERTIFICATE OF CORRECTION

| | | |
|---|---|---|
| PATENT NO. | : 12,279,164 B2 | Page 1 of 1 |
| APPLICATION NO. | : 17/923901 | |
| DATED | : April 15, 2025 | |
| INVENTOR(S) | : Wei Hong | |

It is certified that error appears in the above-identified patent and that said Letters Patent is hereby corrected as shown below:

On the Title Page

In Item (73), under "Assignee", in Column 1, Lines 1 and 2, delete "BEIJING XIAOMI MMOBILE COMPANY SOFTWARE CO., LTD." and insert --BEIJING XIAOMI MOBILE SOFTWARE CO., LTD.--, therefor.

Signed and Sealed this
Tenth Day of June, 2025

Coke Morgan Stewart
*Acting Director of the United States Patent and Trademark Office*